United States Patent
Oakes, III et al.

(10) Patent No.: US 10,991,172 B1
(45) Date of Patent: Apr. 27, 2021

(54) GENERATING MOTOR VEHICLE COMPONENTS

(71) Applicant: United Services Automobile Association, San Antonio, TX (US)

(72) Inventors: Charles L. Oakes, III, Boerne, TX (US); Rickey D. Burks, Boerne, TX (US); Michael P. Bueche, Jr., San Antonio, TX (US)

(73) Assignee: United Services Automobile Association(USAA), San Antonio, TX (US)

( * ) Notice: Subject to any disclaimer, the term of this patent is extended or adjusted under 35 U.S.C. 154(b) by 1459 days.

(21) Appl. No.: 14/927,971

(22) Filed: Oct. 30, 2015

Related U.S. Application Data

(60) Provisional application No. 62/072,823, filed on Oct. 30, 2014.

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC ....... G07C 5/0808; G07C 5/008; G06Q 50/30
See application file for complete search history.

(56) References Cited

U.S. PATENT DOCUMENTS

| | | | | |
|---|---|---|---|---|
| 8,251,204 | B1* | 8/2012 | Mazza | B65G 27/24 198/757 |
| 2002/0075145 | A1* | 6/2002 | Hardman | B60C 23/0433 340/442 |
| 2007/0038497 | A1* | 2/2007 | Britti | G06Q 10/06 726/26 |
| 2009/0005928 | A1* | 1/2009 | Sells | G07C 5/006 701/31.7 |
| 2015/0012445 | A1* | 1/2015 | Reid | G06Q 10/20 705/305 |

(Continued)

FOREIGN PATENT DOCUMENTS

| | | | | |
|---|---|---|---|---|
| CN | 101514942 A | * | 8/2009 | ........... G07C 5/0808 |
| CN | 104412223 A | * | 3/2015 | ............. G07C 5/008 |

(Continued)

OTHER PUBLICATIONS

InnovationQ Plus—IP.com for U.S. Appl. No. 14/927,971—Automotive diagnostic tool and component generation (Year: 2020).*

(Continued)

*Primary Examiner* — Tan D Nguyen
(74) *Attorney, Agent, or Firm* — BakerHostetler

(57) ABSTRACT

A method and system for generating motor vehicle components and/or tool for repairing a vehicle. Indication is received from a remote location that a component on a vehicle has been damaged or is to be altered. The indication includes component identifier information having identifying replacement component information in a data store associated with the particular component based upon the identifier information received. The replacement component information includes a location of a virtual model of a replacement component for the particular component. Generation is then initiated for a motor vehicle component using the received virtual model.

20 Claims, 3 Drawing Sheets

(56) References Cited

U.S. PATENT DOCUMENTS

2015/0220244 A1* 8/2015 Vats .................... G06F 3/04815
715/850
2016/0359683 A1* 12/2016 Bartfai-Walcott ..........................
H04L 41/5009

FOREIGN PATENT DOCUMENTS

CN 106428617 A * 2/2017 ............. G07C 5/008
WO WO-2015100278 A1 * 7/2015 ............. G07C 5/008

OTHER PUBLICATIONS

Scott, K., "The Importance of Automotive Diagnostics in the Search of Excellence", Jan. 1, 1992, Conference Record AUTOTESTCON '92: The IEEE Systems Readiness Technology Conf., pp. 27-30, Abstract. (Year: 1992).*
Krey, M., "Development of Advanced Diagnostic Functions in Very High Volume Automotive Sensor Applications", Sep. 1, 2013, 2013 IEEE International SOC Conference, (pp. 123-128), Abstract. (Year: 2013).*

* cited by examiner

GENERATING MOTOR VEHICLE COMPONENTS

CROSS REFERENCE TO RELATED APPLICATIONS

This application claims priority to U.S. Patent Application Ser. No. 62/072,823 filed Oct. 30, 2014 which is incorporated herein by reference in its entirety.

FIELD OF THE INVENTION

The disclosed embodiments relates to a system, method and process for generating motor vehicle components.

BACKGROUND OF THE INVENTION

Motor vehicles are complex devices that include a variety of components to provide various functions and/or desired motor vehicle configurations. The components may be subject to damage, for instance, damage incurred as a result of a collision. It can be desirable to repair the components, such as damaged components, in an effort to provide the various functions and/or the desired motor vehicle configuration.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for generating motor vehicle components and/or tool for repairing a vehicle is described in which indication is received from a remote location that a component on a vehicle has been damaged or is to be altered. The indication includes component identifier information having identifying replacement component information in a data store associated with the particular component based upon the identifier information received. The replacement component information includes a location of a virtual model of a replacement component for the particular component. Generation is then initiated for a motor vehicle component using the received virtual model.

BRIEF DESCRIPTION OF THE DRAWINGS

The accompanying drawings illustrate various non-limiting, exemplary, inventive aspects in accordance with the present disclosure.

DETAILED DESCRIPTION OF CERTAIN EMBODIMENTS

Figure 1:
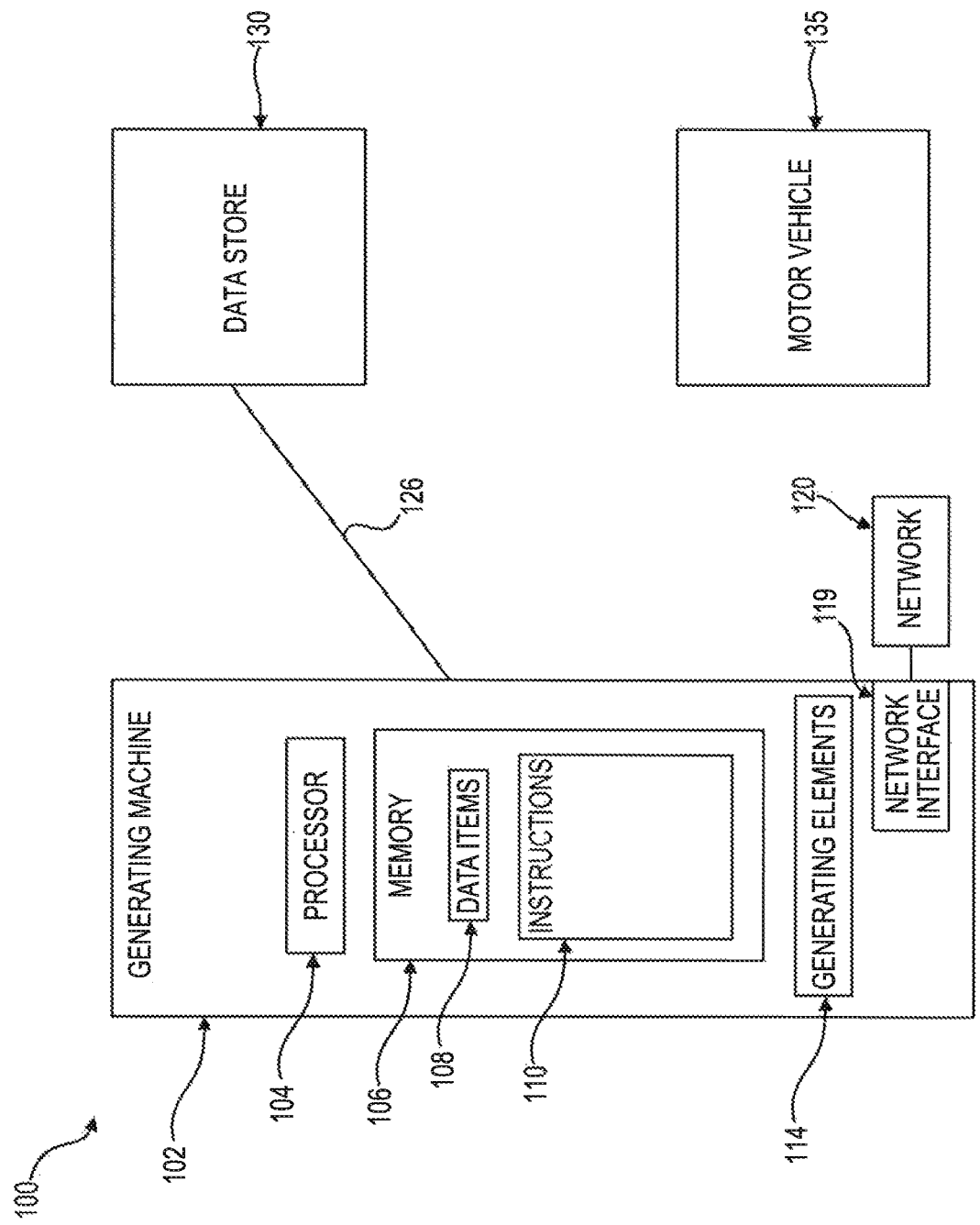
FIG. 1 illustrates an example of a system for generating motor vehicle components according to one or more embodiments of the present disclosure.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either or both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the illustrated embodiments are not entitled to antedate such publication by virtue of prior invention. Further, the dates of publication provided may differ from the actual publication dates which may need to be independently confirmed.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Motor vehicles refer to motorized vehicles capable of self-propulsion including, for example, automobiles, motorcycles, boats, recreational vehicles, etc. Motor vehicles are made from many motor vehicle component that each provide a particular functionality for the motor vehicle. For example, motor vehicle components include, the constituent parts of a motor vehicle, such as doors, fenders, engines, computer panels, etc., that provide a function and/or a desired configuration (e.g., an aesthetically desirable configuration) of the motor vehicle. As such, the motor vehicle components can be located on an interior and/or on an exterior of the motor vehicle. Additionally, the motor vehicle components can be made of steel, metal alloys, electronics, composite materials (e.g., plastics, resins, etc.), among other materials and/or combinations of materials.

Further, in some situations, it can be desirable to alter the components of a motor vehicle to provide a given function and/or motor vehicle configuration. Altering the components of the vehicle can include replacement of a motor vehicle component, for example, that is damaged or past its expected lifespan, and/or addition of additional motor vehicle components to the motor vehicle, for example, in upgrading or changing a motor vehicle's look and/or performance, among other alterations.

For example, it may be desirable to replace an item, such as a damaged motor vehicle component. Damage can occur in a variety of ways such as exposure to environmental elements (e.g., light, heat, hail, etc.) and/or as a result of a force applied to the motor vehicle/motor vehicle component (e.g., resultant forces from an automobile accident), among other ways.

Depending on an extent of damage sustained, a damaged motor vehicle component may be a candidate for replacement. For instance, it may be desirable to replace a damaged motor vehicle component, with a similar component, in an effort to continue to provide a function and/or a desired motor vehicle configuration.

However, the alteration of motor vehicle components may be limited by the availability of resources, for example, availability of a particular motor vehicle component (e.g., a replacement motor vehicle component) at a particular location. Such difficulties can be compounded due to geography (e.g., a comparatively remote location associated with a motor vehicle) and/or other factors such as natural disaster, etc., that may impact availability of motor vehicle components.

In an effort to account for such difficulties, a physical inventory of motor vehicle components may be maintained at a particular location, such as at a repair facility, auto parts store, or warehouse. However, even such physical inventories may be limited by various constraints including size constraints (e.g., a physical volume of available space for the inventory), cost constraints (e.g., cost overhead of the components held in the inventory), among other constraints. As a result, such inventories cannot include every motor vehicle component for every year and model of every motor vehicle and may not include a desired motor vehicle component for a specific make of motor vehicle.

Rather, inventories tend to be specialized in nature (e.g., limited to particular make of motor vehicle) and/or type (e.g., a bumper) of motor vehicle component. Such difficulties and/or shortcomings of inventories may result in an increase in an amount of time it takes to complete an alteration (e.g., replacement of a motor vehicle component) and/or may lead to inconsistencies in quality of the alteration. Further, a motor vehicle component manufactured to specifications other than those provided by an original equipment manufacturer (OEM) of the motor vehicle component may not fit and/or function as desired.

In contrast, the present disclosure provides methods, systems, and computer-readable and executable instructions for generating motor vehicle components. Generating motor vehicle components, in accordance with one or more embodiments, can include generating a motor vehicle component based on an virtual model.

Advantageously, generating motor vehicle components, as described herein, can provide a reliable source of motor vehicle components generated to consistent specifications (e.g., OEM specifications) that can be used to alter a motor vehicle. For example, a variety of motor vehicle components of various specifications corresponding to motor vehicle components for a plurality of makes, etc. of motor vehicles can be readily generated.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

In embodiments of the present disclosure, a motor vehicle can include a number of sensors thereon that can indicate when a component is to be replaced. This can be, for example, when a component's expected life has elapsed, when the component has been damaged, or when a modification to the vehicle is desired (e.g., an aftermarket modification of the vehicle with components that are not the same as the original components provided by the manufacturer for that particular model or year).

In various embodiments, an inventory can be provided that includes motor vehicle components for each vehicle in the inventory and wherein a vehicle owner or repair facility can access this inventory (i.e., a data store in memory of the computing device) to obtain a virtual model of a component (e.g., a set of executable instructions that can be executed by a component generating machine). The virtual model can then be used, for example, to generate the component on a component generating machine (e.g., print the component on a three dimensional (3D) printing device).

The figures herein follow a numbering convention in which the first digit or digits correspond to the drawing figure number and the remaining digits identify an element or component in the drawing. Similar elements or components between different figures may be identified by the use of similar digits. As used herein, "a" or "a number of" something can refer to one or more such things. For example, "a number of objects" can refer to one or more objects.

As discussed above, the embodiments of the present disclosure include methods, systems, and computer-readable and executable instructions for generating motor vehicle components. FIG. 1 illustrates an example of a system for generating motor vehicle components according to one or more embodiments of the present disclosure. As illustrated in FIG. 1, the system 100 can be provided for generating motor vehicle components.

The system 100 can, in various embodiments, include a generating machine 102, such as a 3D printing device, as discussed above. A generating machine refers to a machine that includes generating elements 114 wherein the machine uses material to create a physical model of a component from a set of instructions stored in a data store (e.g., memory, etc.).

Generating elements 114 can be any suitable device/ combination of devices to generate motor vehicle components. For example, generating elements can, in some embodiments, generate a motor vehicle component using additive manufacturing.

Additive manufacturing refers to addition of successive layers of material (e.g., layers having various shapes/specifications) to achieve a desired end product, such as a particular motor vehicle component. However, the present disclosure is not so limited. That is, the generating machine 102 can generate the motor vehicle component using various extrusion manufacturing techniques (e.g., melting, ejection, solidification, etc.), rapid prototyping, freeform fabrication, and/or subtractive manufacturing (e.g., drilling, plasma/laser cutting, etc.), among other techniques suitable to generate motor vehicle components.

In some embodiments, the generating machine 102 can include a processor 104 and a memory 106 which is used as a data store to store data that can be used in the component generation processes described herein. For example, the memory can include an inventory or components, models of components, and/or other information that can be used to identify a component or can be used in the generation of a particular component, as described herein.

Memory 106 can be any type of storage medium that can be accessed by the processor 104 to perform various embodiments of the present disclosure (e.g., create a virtual model of the motor vehicle component, etc.). For example, memory 106 can be a non-transitory generating machine readable medium having generating machine readable instructions 110 (e.g., generating machine program instructions, machine readable instructions, computer readable instructions, etc.) and data items 108 stored thereon. In some embodiments, the generating machine 102 can be at a separate and distinct location from the motor vehicle at a time of generation of a motor vehicle component.

Memory 106 can be volatile or nonvolatile memory. Memory 106 can also be removable (e.g., portable) memory, or non-removable (e.g., internal) memory. For example, memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

The memory 106 can include generating machine readable instructions 110 capable of being executed by the processor 104 to carry out the functions as described herein. In some embodiments, some or all of the functions are carried out via hardware in lieu of a processor-based system. Further, although memory 106 is illustrated as being located in the generating machine, embodiments of the present disclosure are not so limited. For example, memory 106 can, in addition to the memory be located in the generating machine or alternatively, memory 106 can be located internally within another computing resource (e.g., enabling computer readable instructions to be downloaded over the Internet or another wired or wireless connection).

The processor 104 executes instructions, such as generating machine readable instructions 110, and can, in some embodiments, be utilized to control the operation of the entire generating machine. The processor 104 can include a control unit that organizes data and program storage in memory and transfers data and/or other information between the various portions of the generating machine and/or other electronic devices.

Although the generating machine is shown to contain a single processor 104, the disclosed embodiment also applies to devices that may have multiple processors with some or all performing different functions and/or in different ways. The generating machine readable instructions 110 can, for example, include a number of programs such as the applications (e.g., software objects and/or modules, among others). The data items 108, such as information associated with a motor vehicle component and/or a virtual model, can be used (e.g., analyzed by) the generating machine readable instructions 110 during their execution.

In various embodiments, the generating machine 102 can generate a motor vehicle component based on the information associated with the motor vehicle component. For example, the generating machine can generate a three dimensional (3D) copy of a motor vehicle component.

As used herein, a 3D copy of a motor vehicle component refers to a 3D physical duplicate of an original motor vehicle component (e.g., a damaged motor vehicle component installed on a motor vehicle prior to incurring damage) having nearly identical (e.g., substantially similar) specifications (e.g., height, width, length, radius, volume, etc.) as those of the original motor vehicle component. For example, the specifications of the original motor vehicle component can be identical to those of the copy of the motor vehicle component when accounting for manufacturing tolerances in the generation of the copy of the motor vehicle component and/or production of the original motor vehicle component.

The motor vehicle component (e.g., the 3D copy of the motor vehicle component) can be generated using a virtual model (e.g., a respective virtual model associated with the motor vehicle component). The virtual model can be created based on information associated with the motor vehicle component, as described herein. As discussed above, the virtual model may also not be a model viewable on a display, but rather instructions to be used by a generating machine to generate a physical component therefrom.

In some embodiments, the information associated with the motor vehicle component can include a manufacturer (e.g., original equipment manufacturer (OEM) or non-OEM), an identifier of the motor vehicle component (e.g., a motor vehicle component number), an expected life (e.g., an average duration of useful life of a motor vehicle component), a type of material, specifications, an indicator of a presence of electronics embedded within the motor vehicle component, and/or other information that can be associated with the motor vehicle component. In some embodiments, an identifier of the motor vehicle component can correspond to a particular virtual model, for example, a virtual model to generate a copy of the motor vehicle component corresponding to the identifier, wherein the virtual model and/or identifier are stored in a data store (e.g., data store 130).

In some examples, a manufacturer (e.g., OEM or non-OEM) of a motor vehicle component can be displayed. For example, a manufacturer of each of a plurality of motor vehicle components included in a particular motor vehicle (e.g., motor vehicle 135) can be displayed. The display can provide a listing of a total number of OEM motor vehicle components (e.g., a percentage of OEM motor vehicle components) and/or a total number of non-OEM (e.g., a percentage of non-OEM motor vehicle components), among other information.

Such a display can be present on a display within the particular motor vehicle and/or at a display external to the motor vehicle (e.g., a repair facility or on a display of insurance claim investigator (e.g., at an insurance provider or on a mobile device such as a laptop computer or mobile phone), such as those described herein. Displaying the manufacturer for the motor vehicle component and/or each of the plurality of motor vehicle components can readily enable a user to identify information such as a total number of OEM components in a motor vehicle and/or promote generating motor vehicle components. As discussed above, information associated with the motor vehicle component, such as specifications of the motor vehicle component, can be used to create a 3D virtual model of the motor vehicle component.

In some embodiments, the 3D virtual model can refer to a mathematical representation of a motor vehicle component based on information associated with a motor vehicle component. The mathematical representation can include a collection of points in a 3D space that can be connected by various geometric connectors.

Such geometric connectors can include, for example, triangles, lines, and curved surfaces, among other geometric connectors. That is, 3D virtual models can include solid models and/or shell models, among other types of virtual models, as discussed herein.

Solid models refer to virtual models that define a volume of the motor vehicle component they represent. Solid models can be formed, for example, using constructive solid geometry, among other techniques. Shell models refer to virtual models of a surface (e.g., a boundary) of a motor vehicle component they represent.

Virtual models can be created manually and/or automatically (e.g. through use of procedural modeling and/or based on a scan of a motor vehicle component). For example, a virtual model can be created automatically based upon a two dimensional image (e.g., a photo) using triangulation, approximation, and/or other suitable mathematic techniques to create the virtual model therefrom. For example, an automobile part for a vehicle in which a manufacturer is no longer providing replacement parts, may be recreated through analysis of two dimensional pictures taken of the part on the vehicle (the part to be replaced) and/or from pictures of the part in a catalog and/or in a parts data store as discussed in more detail herein.

In various embodiments, information associated with a plurality of motor vehicle components can be stored in a data store 130. The data store can include memory as described herein and/or a database, among other suitable types of storage. In some embodiments, the data store 130 can be located within a motor vehicle, such as motor vehicle 135. A data store located in a motor vehicle 135 can, for example, include an inventory of components and can include information associated with some (e.g., exterior components, components associated with a particular function of the vehicle, etc.) or all of the motor vehicle components (e.g., all exterior and interior motor components) of the motor vehicle 135.

The data store 130 can, in some embodiments, include information associated with all motor vehicle components that do not include electronics embedded therein. In such an embodiment, the information may be limited as the generating machine may be unable to print such electronic part, however, the present embodiments are not so limited.

In some embodiments, the data store 130 can include information associated with a component indicated as a damaged component. This information can be beneficial in determining what components need replacement and potentially, what other components may need replacement due to their interaction with the component indicated as damaged. In some embodiments, the data store 130 can be located within the motor vehicle 135 and/or can include respective information to generate each of a plurality of motor vehicle components (e.g., external components and/or internal components) included in a motor vehicle 135.

While the data store 130 can be located within a motor vehicle 135, the present disclosure is not so limited. For example, the data store 130 can be located at a shop (e.g., a repair facility capable of replacing a damaged motor vehicle component with a generated motor vehicle component) and/or a location associated with an insurance provider (e.g., an insurance provider of the motor vehicle 135), among other locations.

In some embodiments, the data store 130 can be located at a separate and distinct location from a motor vehicle 135 at a time of generation of a motor vehicle component (e.g., a 3D copy of a motor vehicle component). Advantageously, this can enable generation of the motor vehicle component by a number of possible entities including those located at a separate and distinct location from the motor vehicle.

For example, a facility can be contacted and a replacement time can be scheduled wherein the facility can then receive a motor vehicle component following generation of the motor vehicle component and install the component on the vehicle at a time convenient to the repair facility and/or the vehicle owner. For instance, in some embodiments, the data store 130 can include a virtual model of a motor vehicle component (as used herein, a virtual model can also be a set of instructions that are executable by a component generating machine to create a physical vehicle component) indicated as damaged.

As discussed herein, additional, advantages can be realized by utilization of a data store that can include information to generate components for a plurality of types (e.g., makes) of motor vehicles. For example, a data store(s) at a location associated with an insurance provider can include information associated with generating components for a plurality of types of vehicles the insurance provider provides insurance to.

In some embodiments, the generating machine 102 can include a display (not shown). The display can be included in the generating machine 102, or connected thereto, to display information (e.g., to a user of generating machine 102). Information can, for example include, information about the component to be replaced on the vehicle, information about the identity and/or location of the virtual model, information about the cost of a virtual model from a third party provider of virtual models, and/or status of the generation of the component (e.g., whether the component has been produced and is ready to be installed, which may be helpful for the vehicle user to know as they may be located remotely from the repair facility, and may be helpful to other parties as well), among other information that may be of use to the viewer of the display (e.g., the vehicle owner, generating machine user, insurance provider, a display on a handheld device (e.g., a mobile phone), etc.).

A display can include a screen, for example, a graphical user interface (GUI) that can provide (e.g., display and/or present) information to a user of generating machine 102. For example, the display can be used to display a GUI to digitally represent information and/or receive an input provided via the display (e.g., via a user interface). The display may be for example, a liquid crystal display (LCD), however, any appropriate display device and/or screen may be used. Further, generating machine 102 can include any number of displays.

The display can, in some embodiments, provide an indication of an expected life time of a component, as discussed above. This information can be useful, for example, in determining which components are in need of replacement and/or may be in need of replacement within a certain period of time wherein the expected life time of a component, as used herein can be defined as a particular period recommended by a manufacturer of the original component and/or vehicle; a defined period such as within a number of weeks, months, years; a period between visits to the facility; under a warranty period; under a scheduled maintenance plan; etc.).

Accordingly, in some embodiments, the display can provide a simultaneous display of a plurality of representations indicative of respective expected life times for each of the plurality of motor vehicle components. Such a display can enable readily identifying components of the plurality of motor vehicle components that are within a threshold amount of time of satisfying the expected life and/or motor vehicle components that have exceeded their expected life. Readily identifying such motor vehicle components can increase the life span of components that interact with the identified component and, potentially, the vehicle as a whole. Further, such identification can identify motor vehicle components to be generated, as described herein.

As used herein, for example in the previous paragraph, an indication refers to a visual, auditory, or other sensory output that can provide an indication of various pieces of information. The information can, in some embodiments include, information indicative of when an indication of damage to a motor vehicle component is received, an indication of initiation of generation of a motor vehicle component, indicative of an expected life of a motor vehicle component of the plurality of motor vehicle components, and/or an indication of completion of generation of a motor vehicle component, among other indications.

Additionally, the generating machine 102 can receive information from the user of generating machine 102 through an interaction with the user via a display. For instance, the generating machine 102 can receive an input from the user via display (e.g., a touch screen display or via another user input device such as a keyboard in response to interaction with items shown on the display). For example, a user can enter the input into the generating machine 102 using a mouse and/or keyboard associated with the generating machine 102 (e.g., a display). Such an input can, for example, include a request to generate a motor vehicle component.

In some embodiments, the generating machine 102 can include a network interface 119. This can allow information about the generation of a component to be sent or received by the generating machine. The network interface 119 can, for example, include a receiver and/or a transceiver (e.g., wired and/or wireless), among other components suitable for communication with a network (e.g., a mobile communications network). The network interface 119 can connect the generating machine 102 to a network 120.

Network 120 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 120) can provide a communication system that directly or indirectly links computers and/or peripheral devices and allows users to access resources on other computing resources (e.g., generating machines and/or data stores, etc.) and/or exchange messages with other users.

The network 120 can allow users to share resources on their own systems with other network users and to access information on centrally located systems or on systems that are located at remote locations. For example, network 120 can permit a generating machine 102 to generate motor vehicle components at a location that is separate and distinct from an intended destination of the generated motor vehicle component and/or from a data store storing information associated with a motor vehicle component to be generated.

The network 120 may provide connections to the Internet and/or to the networks of other entities (e.g., organizations, institutions, etc.). Users may interact with network-enabled generating machine applications to make a network request, such as to get a file (e.g., a file including 3D virtual model of a motor vehicle component) or a request to generate a particular motor vehicle component. Such a network-enabled generating machine applications can also communicate with network management software, which can interact with network hardware to transmit information between devices on the network.

A motor vehicle 135, such as those described herein, can be coupled directly (e.g., via a wired connection) and/or indirectly (e.g., wirelessly) to the generating machine 102, such as via a network as described above. For example, the link 126 can, in some embodiments, be coupled via a wire connection and/or wirelessly to a transceiver included in the generating machine 102 to receive information (e.g., a 3D virtual model) via the transceiver from a data store (e.g., an inventory of motor vehicle component information), such as data store 130, included in the motor vehicle 135.

That is, although FIG. 1 illustrates a single data store external from the generating machine 102 and the motor vehicle 135, the present disclosure is not so limited. The data store 130 can include a number of data stores at a number of locations, for example, included within the generating machine 102, a repair facility, a motor vehicle 135, and/or at a location associated with an insurance provider, among other locations suitable for generating motor vehicle components, as described herein.

Figure 2:
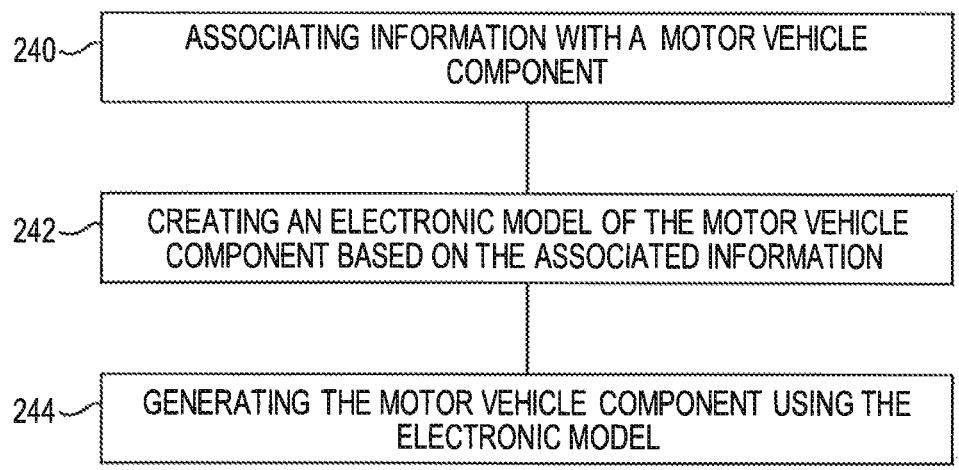
FIG. 2 illustrates a block diagram illustrating an example of a method for generating motor vehicle components according to one or more embodiments of the present disclosure.

FIG. 2 illustrates a block diagram of an example of a method for generating motor vehicle components according to one or more embodiments of the present disclosure. In various embodiments, the method can include associating information with a motor vehicle component, as shown at block 240. Associating information can include associating information, such as the information described herein, from an insurance provider (e.g., an insurance provider providing insurance to a motor vehicle (such as motor vehicle 135, as illustrated in FIG. 1) including the generated motor vehicle component or component to be generated) and/or an original manufacturer (e.g., of the motor vehicle component), etc., with the motor vehicle component.

As used herein, the term associating can include executing instructions stored in memory (e.g., memory 106) to associate information with a motor vehicle component (e.g., placing an identifier in a data store that links a model for a vehicle component to the identifier and/or other information that may be relevant to the selection of a component and/or generation of a component). Similarly, blocks 242 and 244 can include executing instructions stored in memory to perform the examples of the method described therein. Such a motor vehicle component can be generated by a generating machine analogous or similar to the generating machine 102, as described with respect to FIG. 1, while the data store can be analogous or similar to the data store 130, described with respect to FIG. 1.

A virtual model can, for example, be created, as described herein, from the information associated with a motor vehicle component. For instance, as shown at block 242, in various embodiments, the method can include creating a virtual model of the motor vehicle component based on the associated information. In some embodiments, creating the virtual model can include creating the virtual model based upon specifications, as described herein, associated with the motor vehicle component.

In various embodiments, the method can include generating the motor vehicle component, as described herein, based on the virtual model, as shown at block 244. Generating can, in some embodiments, include generating the motor vehicle component using additive manufacturing, as discussed above.

In some embodiments, the method can include receiving an indication of damage to a motor vehicle component included in a motor vehicle. Such an indication can, in some embodiments, cause the generation of a motor vehicle component (e.g., generation of a 3D physical copy of the motor vehicle component indicated as damaged). In some embodiments, the method can include displaying an expected life, as described herein, of the generated motor vehicle component.

In some embodiments, the method can include altering a motor vehicle with the generated motor vehicle component. Such alterations can be performed manually, for example, based upon a procedure associated with the generated motor vehicle component and/or automatically (e.g., by a robotically controlled machine), among others ways to alter the motor vehicle.

In some such embodiments, altering can include altering the motor vehicle without applying a coating (e.g., primer and/or paint, etc.) to the generated motor vehicle component. This can be beneficial, for example, where an OEM part has to be painted or otherwise coated with a material, for instance, before it is installed on the vehicle. In various embodiments, the generating machine can produce a component that does not need to have a coating applied (e.g., the component can be generated in a color that matches the paint of the OEM component or other suitable color). Such embodiments can save several manufacturing steps, among other advantages.

That is, the motor vehicle component can be generated and/or the motor vehicle can be altered with the generated motor vehicle component without coating the generated motor vehicle component (e.g., without coating at any point prior, during, and/or after altering the motor vehicle with the generated motor vehicle component). As discussed above, advantageously, defects (e.g., discrepancies between various motor vehicle components intended to have similar paint color) that may be associated with painted motor vehicle components can be avoided by generating motor vehicle components, as described herein.

Figure 3:
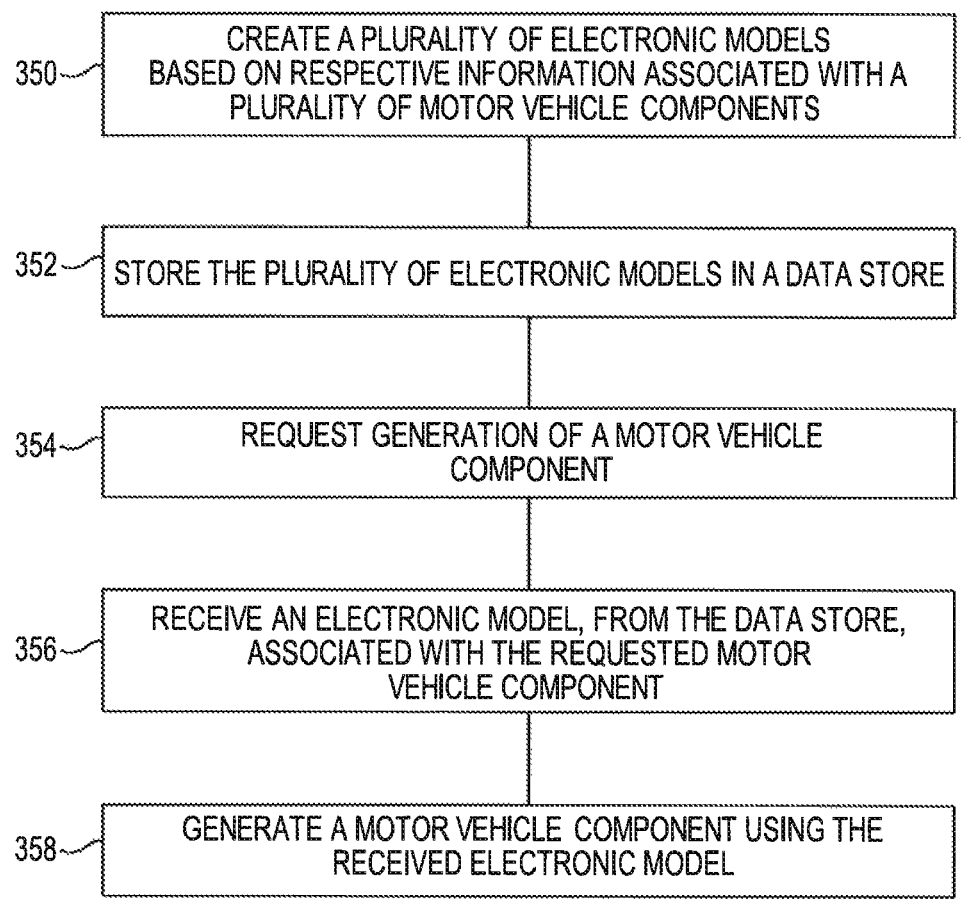
FIG. 3 illustrates a block diagram illustrating an example of a set of instructions to generate motor vehicle components according to one or more embodiments of the present disclosure.

FIG. 3 illustrates a block diagram illustrating an example of instructions to generate motor vehicle components according to one or more embodiments of the present disclosure. As illustrated in block 350, the instructions can, in various embodiments, include instructions executable by the processor to create a plurality of virtual models based on respective information associated with a plurality of motor vehicle components. The instructions (e.g., generating machine readable instructions 110, as described in FIG. 1) can include instructions executable by the processor to store the plurality of electronic models in a data store, as illustrated at block 352.

As illustrated at block 354, the instructions can include instructions executable by the processor to request generation of a motor vehicle component (e.g., a 3D copy of a motor vehicle component). The request can be provided, for example, by a user of the generating machine interacting directly (e.g., inputting information for the request into a user interface of the generating machine) and/or indirectly (e.g., remotely communicating with the generating machine from another device) with the generating machine. However, the present disclosure is not so limited, that is, the request can be provided automatically (e.g., without a user requesting generation).

For example, generation of motor vehicle component can be automatically requested upon receipt of an indication of damage to a motor vehicle component and/or automatically requested based on an expected life of a motor vehicle component (e.g., upon the motor vehicle component reaching/exceeding its expected life). Such indications can be provided, for instance, by a vehicle and/or component manufacturer, a repair facility, an insurance provider, by the vehicle (via sensors that can indicate damage, excessive wear, and/or expiration of an expected life of one or more components of a vehicle) or any other suitable party.

The instructions can include instructions executable by the processor to receive a virtual model (e.g., a 3D virtual model), from the data store, associated with the requested motor vehicle component, as illustrated at block 356. For example, a virtual model can be received from the data store in response to receipt of a request, such as the request described at block 354. The virtual model can, in some embodiments, be provided directly to a generating machine (e.g., generating machine 102) via a user input(s), for instance, user inputs provided to a display and/or keyboard associated with the generating machine (e.g., a display included in generating machine and/or a display located external to the generating machine).

As illustrated at block 358, the instructions can include instructions executable by the processor to generate the motor vehicle component using the received virtual model (e.g., using information included in a received 3D virtual model). Generation can, for example, occur in response (e.g., automatically in response) to receipt of a virtual model, for instance, as described at block 356. In some embodiments, the instructions to generate include instructions to generate a motor vehicle component having electronics included therein. For example, electronics can be included in a motor vehicle component during generation of the motor vehicle component.

The instructions to generate can, in some embodiments, include instructions to generate the motor vehicle component based on an expected life of a motor vehicle component. As discussed above, an expected life can be specified by a manufacturer of the motor vehicle component (e.g., an OEM) and/or by an insurance provider providing insurance that covers a motor vehicle including the motor vehicle component, among other entities that may specify an expected life and may include other periods as discussed above.

For example, an expected life can be specified for each of the interior components, exterior components, non-electrical components, and/or electrical components. A generated motor vehicle component, similar to an original motor vehicle component, as described herein, can include an expected life. An expected life for a motor vehicle component can be stored in a data store. Thus, a plurality of respective expected lives can be displayed for a plurality of motor vehicle components (e.g., a plurality of motor vehicle components including a generated motor vehicle component). Advantageously, this can enable readily identifying which, if any, of the plurality of motor vehicle components are approaching (e.g., within a threshold amount of time) and/or have exceeded an expected life.

For example, the motor vehicle component can be generated based upon a particular motor vehicle component exceeding an expected life associated with the particular motor vehicle component (i.e., based on its expected life, as defined herein). Similarly, in some embodiments, the instructions to generate can include instructions to generate a motor vehicle component based on an indication that the motor vehicle component is within a threshold amount of time (e.g., one week) of satisfying an expected life (e.g., 7 years from a time of initial sale or installation of the motor vehicle component, etc.). This can be beneficial, for example, in allowing components close to their expected life duration to be replaced while the vehicle is being serviced for replacement of another component or before the component reaches the end of its expected life, among other benefits.

In some embodiments, the instructions to generate a component can include instructions executable by the processor to prioritize generation of a motor vehicle component of a plurality of motor vehicle components requested for generation. Such prioritization can promote ordered alterations of the motor vehicle with the generated motor vehicle components, for example, as specified by a procedure (e.g., an order associated with replacement of a bumper assembly of an automobile may include many components including, for example: light assemblies, bumper, bumper pistons, bumper cover, electronic wiring within the bumper, electronic components within the bumper, headlight washer assembly, etc. and such components may have a particular order of assembly in order to assemble the bumper properly).

In some embodiments, the instructions can include instructions executable by the processor to provide a procedure (e.g., a procedure included in a manual) to alter the motor vehicle using a generated motor vehicle component. A procedure refers a particular process to alter the motor vehicle using a generated motor vehicle component that is specific to a particular motor vehicle component and/or particular motor vehicle. For example, the procedure can be specific to a number of particular function(s) and/or properties (e.g., material type), etc., of a generated motor vehicle component (e.g., a 3D generated copy of a damaged motor vehicle component) and can be provided, for example, to a vehicle owner, repair facility, and/or insurance provider, among others.

Similarly, a procedure can be specific to a make, year of manufacture of a motor vehicle, etc. For instance, the procedure can include a number of actions to be performed, for example, by an individual at a shop to replace a particular motor vehicle component (e.g., a bumper) in a particular motor vehicle (e.g., an automobile of a particular make and year of manufacture, etc.). In some embodiments, the instructions can include instructions executable by the processor to provide the procedure to a display. For example, the procedure can be provided to a display associated with the generating machine (e.g., a GUI included in the generating machine), a display on a handheld device (e.g., a mobile phone), a display located in a facility, and/or a display included in the motor vehicle, among other displays, to display the procedure. The procedure can be stored in a data store, such as data store 130 described with respect to FIG. 1.

In yet additional embodiments, and in accordance with the teachings herein for generating a component for installation on a vehicle, it is to be appreciated the present described invention may be further configured to generate a tool component needed for repair of a vehicle or for installing a component onto a vehicle.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A method for generating motor vehicle components, comprising:

receiving an indication from a remote sensor at a remote location that a particular component on a motor vehicle requires replacement based on damage or end of an expected life, wherein the indication includes component identifier information;

identifying replacement component information in a data store that is associated with the particular component based upon the identifier information received, and wherein the replacement component information includes a location of a virtual model of a replacement component for the particular component;
identifying tool component information in a data store that is associated with a tool component, wherein the tool component is needed to install the replacement component on the motor vehicle;
initiating generation of the replacement component using the virtual model;
initiating generation of the tool component; and
sending a status of the generation of the replacement component and the tool component to the remote location wherein the status indicates whether the replacement component is ready for installation into the motor vehicle.

2. The method of claim 1, wherein the method includes calculating the expected life of one or more additional motor vehicle components of the motor vehicle to determine if any of the additional components are due for replacement.

3. The method of claim 1, wherein the information includes specification of the particular component, and wherein creating includes creating the virtual model based upon the specifications associated with the particular component.

4. The method of claim 1, wherein the replacement component information includes a component color, and wherein initiating generation of the replacement component includes matching the component color without applying a coating to the generated replacement component.

5. The method of claim 1, wherein the method includes:
receiving an indication of damage to the particular component included in the motor vehicle; and
replacing the particular component indicated as damaged with the generated replacement component.

6. The method of claim 1, further comprising:
scheduling a replacement time based on the generation of the motor vehicle component, the availability of a repair facility, and the availability of an owner of the motor vehicle.

7. The method of claim 1, further comprising:
initiating generation of one or more additional motor vehicle components, wherein the motor vehicle component and the additional motor vehicle components are subcomponents of the particular component of the motor vehicle requiring replacement, and
wherein the motor vehicle component, the additional motor vehicle components, and the tool are generated in a priority order.

8. The method of claim 7, wherein the priority order is based on an order of assembly.

9. A non-transitory computer-readable medium storing instructions executable by a processor to:
provide a plurality of virtual models based on respective information associated with a plurality of motor vehicle components in a data store;
receive a request to generate a motor vehicle component based on an indication that, based on sensor data from a sensor of a motor vehicle, the motor vehicle component requires replacement based on damage or end of an expected life;
identify a particular component to be generated based upon the received request;
identify a tool required to install the motor vehicle component onto the motor vehicle;
locate a virtual model, from the data store, associated with the requested motor vehicle component;
locate a tool model, from the data store, associated with the tool; and
initiate generation of a replacement motor vehicle component and the tool using the virtual model and the tool model.

10. The medium of claim 9, wherein the medium includes instructions executable by the processor to display a procedure to replace a motor vehicle with the generated motor vehicle component.

11. The medium of claim 9, wherein the data store includes the expected life of each of the plurality of motor vehicle component, and wherein the instructions include instructions to display an indication of the expected life of each of the plurality of motor vehicle components.

12. The medium of claim 11, wherein the instructions to generate include instructions to generate the motor vehicle components based on an expected life of a motor vehicle component of the plurality of motor vehicle components.

13. The medium of claim 12, wherein the instructions to generate the motor vehicle component based on an indication that the motor vehicle component has exceeded its expected life.

14. The medium of claim 9, wherein the instructions to generate the motor vehicle component based on an indication that the motor vehicle component is within a threshold amount of time of satisfying its expected life.

15. A system for generating motor vehicle components, comprising:
a data store including respective virtual models associated with a plurality of motor vehicle components and a tool required for installation of one or more of the plurality of motor vehicle components to a motor vehicle; and
a generating machine to generate a 3D physical copy of a motor vehicle component of the plurality of motor vehicle components and a 3D physical copy of the tool, using a respective virtual model associated with the motor vehicle component and a tool model associated with the tool, in response to receipt of an indication from a sensor of damage to the motor vehicle component.

16. The system of claim 15, wherein the data store is located within a motor vehicle that includes the motor vehicle component indicated as damaged.

17. The system of claim 16, wherein the data store includes respective information to generate each of a plurality of external motor vehicle components included in the motor vehicle.

18. The system of claim 15, wherein the data store is located, external to a vehicle, at a location associated with an insurance provider providing insurance to the motor vehicle.

19. The system of claim 15, wherein the generating machine generates the motor vehicle component using additive manufacturing.

20. The medium of claim 15, wherein the instructions to generate include instructions to generate a motor vehicle component having electronics included therein.

* * * * *